J. WILKINSON.
COUPLING.
APPLICATION FILED MAR. 27, 1919.

1,434,759.

Patented Nov. 7, 1922.
2 SHEETS—SHEET 1.

Inventor:
James Wilkinson,
by Albert E. Davis
His Attorney

J. WILKINSON.
COUPLING.
APPLICATION FILED MAR. 27, 1919.

1,434,759.

Patented Nov. 7, 1922.
2 SHEETS—SHEET 2.

Inventor:
James Wilkinson,
by *Albert G. Davis*
His Attorney.

Patented Nov. 7, 1922.

1,434,759

UNITED STATES PATENT OFFICE.

JAMES WILKINSON, OF SCHENECTADY, NEW YORK, ASSIGNOR TO GENERAL ELECTRIC COMPANY, A CORPORATION OF NEW YORK.

COUPLING.

Application filed March 27, 1919. Serial No. 285,701.

*To all whom it may concern:*

Be it known that I, JAMES WILKINSON, a citizen of the United States, residing at Schenectady, in the county of Schenectady, State of New York, have invented certain new and useful Improvements in Couplings, of which the following is a specification.

The present invention relates to couplings such as are used to connect together two adjacent shaft ends, for example, the two adjacent ends of a driving shaft and a driven shaft, and particularly to couplings comprising adjacent face plates or flanges carried by the shaft ends and having interengaging members which transmit the load and which at the same time permit axial adjustments of the shafts relatively to each other to take place.

For some uses it is important for the successful operation of the apparatus that axial adjustments between the driving and driven shafts, take place readily, and one object of my invention is to provide an improved structure which is not likely to stick or bind. Also, where a number of interengaging members are used, it is essential to the successful operation of the coupling that the load or pressure be approximately equally distributed among the members, because any member carrying excessive load is subject to wear and is likely to stick. Equal division of the load depends upon the proper engagement of all the interengaging members and a further object of my invention is to provide an arrangement wherein the operative condition of the coupling may be tested readily with a minimum of effort.

A further object of my invention is to provide an improved arrangement for lubricating a coupling of the character referred to and for separating out any water which may be carried in with the lubricant.

For a consideration of what I believe to be novel and my invention, attention is directed to the accompanying description and the claims appended thereto.

Figure 1:
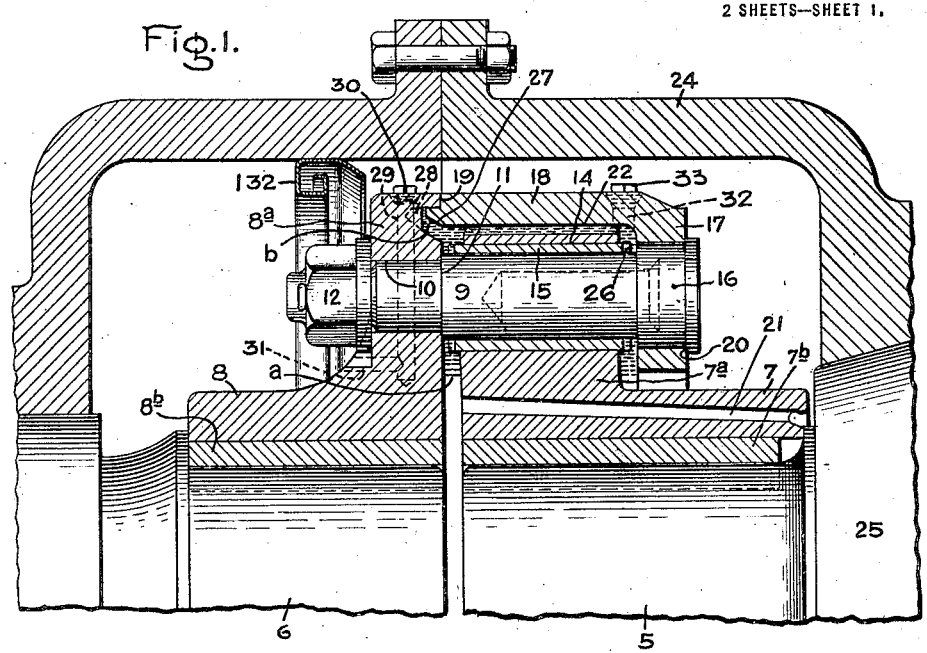
Figure 2:
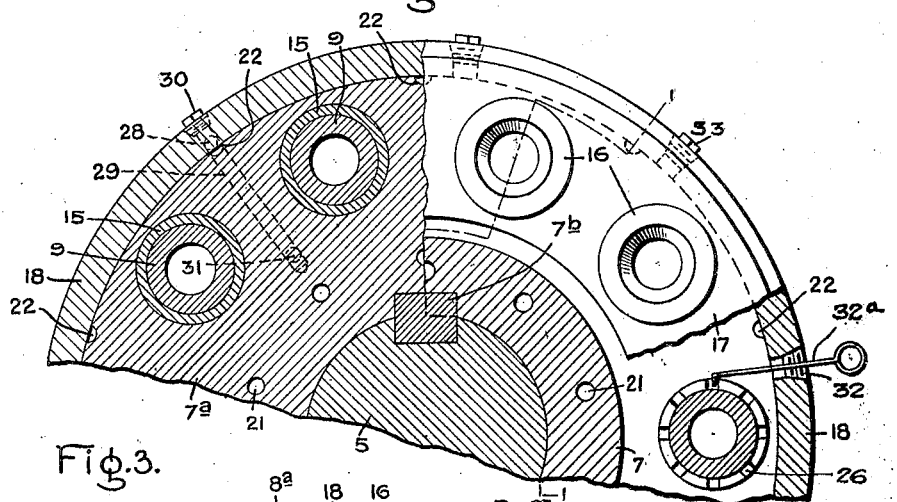
Figure 3:
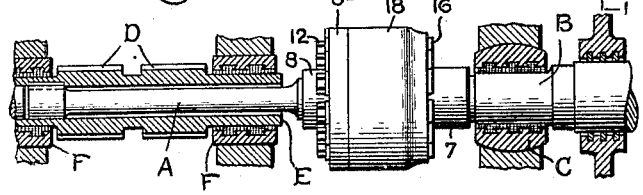
Figure 4:
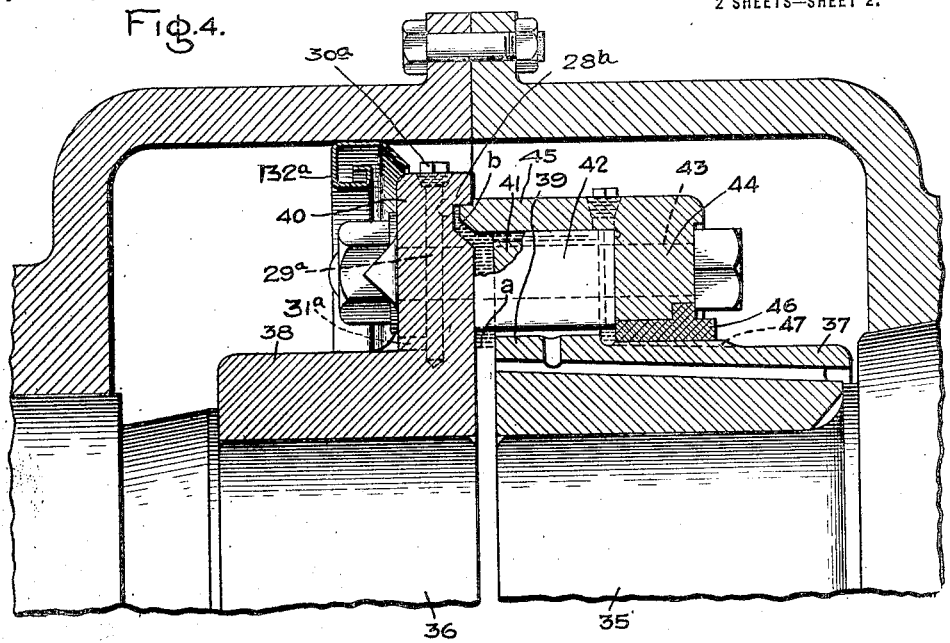
Figure 5:
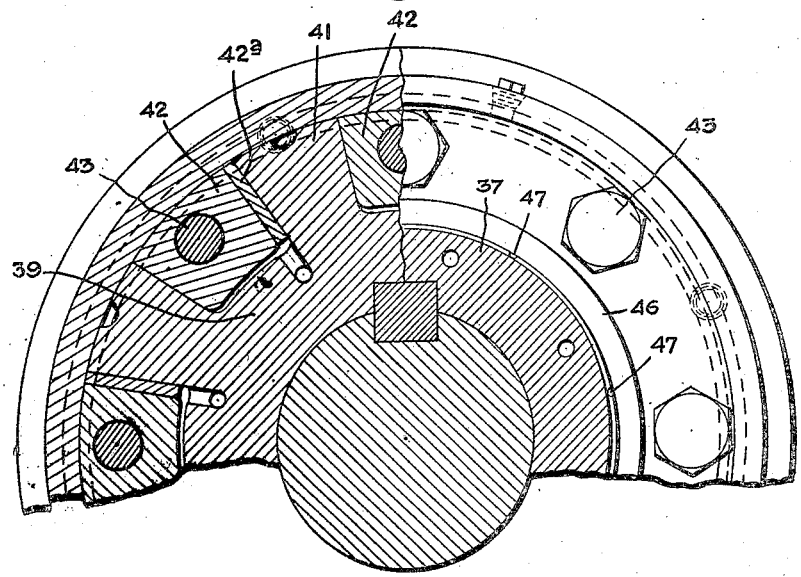

In the drawing, Fig. 1 is a sectional view of a coupling embodying my invention the section being taken on line 1—1. Fig. 2; Fig. 2 is a view of the structure shown in Fig. 1 partly in section; Fig. 3 is a view showing an application of my coupling; and Figs. 4 and 5 are views similar to Figs. 1 and 2 of another structure embodying my invention.

In Figs. 1 and 2, my invention is illustrated in connection with a coupling of the pin type and is shown as connecting the adjacent ends of the two shafts 5 and 6. It will be understood that one of these may be a driving shaft and the other a driven shaft. On the end of shaft 5 is keyed a sleeve 7 which carries a flange or coupling member or element $7^a$ and on the end of shaft 6 is keyed a sleeve 8 which carries a flange or coupling member or element $8^a$. The keys are indicated at $7^b$ and $8^b$ respectively. Fixed to flange $8^a$ and projecting axially therefrom are pins 9, there being a suitable number arranged in a ring. The flange $8^a$ has openings 10 through which an end of the pins projects and these pins have shoulders 11 which engage the flange on one side and threaded ends which project beyond the other side of the flange and receive nuts 12. When nuts 12 are screwed up the pins 9, as is obvious, are firmly fixed to flange 8.

Pins 9 project through openings 14 in flange $7^a$ and in accordance with my invention I provide between the outer surfaces of the pins 9 and the surfaces of openings 14, floating bushings 15 which engage such surfaces to form bearings but are free to move axially. Floating bushings 15 project beyond the faces of flange $7^a$ and are limited in their axial movement on the one hand by flange $8^a$ and on the other hand by heads 16 on the ends of the pins. The arrangement is such that with the maximum axial movement an end of a bushing 15 will not move within the confines of flange $7^a$. Heads 16 of the pins are located in openings in a flange 17 carried by the outer end of a ring 18, the inner end of which engages flange $8^a$, there being a rabbeted joint 19 between them. Heads 16 are provided with shoulders 20 which engage the outer surface of flange 17 so that when nuts 12 are screwed up, ring 18 is firmly clamped between shoulders 20 and flange $8^a$. With this arrangement pins 9 are supported at both ends and cannot well become bent or get out of alignment. Preferably the pins are bored out to make them hollow as indicated in dotted lines in Fig. 1 and as shown in Fig. 2 so as to lighten their weight.

To lubricate the coupling I provide a number of openings 21 which extend through sleeve 7 and supply lubricant to the space between the shaft ends. From here it is thrown out by centrifugal force and some passes through between the inner and outer surfaces of the floating bushings 15 and the parts upon which they slide to lubricate them, and the rest passes through grooves 22 formed at spaced points between the periphery of the flange 7ª and ring 18 and serves to provide lubricant for these parts which slide on each other when axial adjustment takes place. 24 is a casing to catch the overflow of lubricant from the coupling. Lubricant may be supplied to openings 21 from any suitable source. In the present instance I have shown openings 21 as terminating adjacent a bearing 25 for shaft 5 and in this case the lubricant which spills from the bearing is supplied through openings 21 to the coupling. With this arrangement, it will be seen, all the moving parts are flooded with lubricant which ensures ample lubrication at all times.

To separate water from the lubricant I provide an annular passage 27 which extends from the periphery of the space between flanges 7ª and 8ª in a generally radial direction so its outer end is farther from the axis of the shafts than its inner end. The outer end of annular passage 27 is connected by an opening 28 to the radially outer end of a radially extending hole 29 in flange 8ª. The outer end of hole 29 is closed by a pipe plug 30 and the inner end communicates with an axially extending hole 31 in flange 8ª. Opening 28, hole 29 and hole 31 form a discharge passage connecting annular passage 27 to the outside of the coupling at a point adjacent the shaft and one discharge passage or more than one discharge passage may be provided as found desirable.

When the shafts and coupling are rotating, the lubricant is thrown out by centrifugal force and will establish a centrifugal oil level as indicated at $a$, lubricant filling the space between flanges 7ª and 8ª from level $a$ to the periphery of such space. Any water contained in the lubricant since it is heavier than the lubricant, will be thrown to the periphery of the space and to the radially outer end of annular passage 27 from which point it will be discharged through opening 28 and holes 29 and 31 to the outside. The radial depth of hole 29 is made such that in case water enters the coupling a water column will be established which will just balance a combined oil and water column when the level between the oil and water stands at about level $b$. When no water is present oil level $a$ will of course not be at the same point as when water is present since oil is lighter than water although obviously a level will in all cases be established. Level $b$, it will be noted, is located radially beyond the inner surface of ring 18 so that nothing but oil can find its way through the coupling to lubricate the same. As water is thrown out by centrifugal force the columns become unbalanced with the result that water is spilled out of hole 31 until a balance is again effected. As a result after radial hole 29 becomes primed with water, nothing but water can escape through the discharge passage. At the same time no water will be fed to the bearing surfaces. Whatever liquid is discharged from hole 31 is thrown outward by centrifugal force and I preferably provide a suitable annular member 132 carried by casing 24 to catch such liquid and direct it to a discharge pipe or opening at the lower side of the casing. (Not shown.)

To test the alignment of the coupling and ascertain if each pin is carrying its share of the load, I provide the end of each floating bushing 15 with notches 26, and in ring 18 adjacent each pin is a hole 32 normally closed by a plug 33. After removing plugs 33 a suitable tool such as a wire having a hook on its end as indicated at 32ª in Fig. 2 may be inserted through holes 32 and engaged with notches 26 to turn bushings 15. By putting some torque on the coupling and trying the successive bushings 15 it may be readily ascertained which are binding and hence are carrying the most load and which are loose and hence are carrying little load. This condition may then be remedied. This arrangement is also very useful in assembling the coupling.

The use of floating bushings 15 also serves to compound the bearings providing double sliding surfaces and thus reducing to a minimum the likelihood of the coupling binding.

It will also be clear that a coupling as shown is adapted for rotation in either direction.

Referring now to Fig. 3 I have shown my improved coupling arranged in a combination wherein the left hand flange 8ª is carried on the end of a shaft A which shaft has no bearing immediately adjacent the flange, while the right hand flange 7ª is carried by a shaft B having an adjacent bearing C. In the present instance shaft A is shown as being a shaft which drives a pinion D carried by a quill shaft E, quill shaft E being supported at its two ends by bearings F. Shaft A is connected to quill shaft E at the end remote from the coupling and introduces a certain degree of flexibility into the drive. Now, with such an arrangement it is clear that the coupling must support the one end of shaft A and by the use of ring 18 which forms in substance a part of flange 8ª I provide a bearing means which has large bearing surfaces, the ring 18 bearing on the periphery of flange 7ª throughout its circumference. This means that the one end of shaft A is well supported by the coupling, and that the bearing means is sufficiently strong so that the coupling is not likely to be deranged due to the shaft A being supported thereon.

I also so arrange the coupling that the center of mass of ring 18 is over and in line with the centers of pins 9. With this arrangement in case of flexure of shaft A the bearing ring and coupling move together, producing the minimum disturbance in the coupling.

Referring now to Figs. 4 and 5, I have shown a coupling which in many respects is like that shown in Figs. 1 and 2, differing therefrom only in the manner in which the flanges are connected together, the coupling of Figs. 4 and 5 being of the so-termed jaw type. The two shafts are indicated by numerals 35 and 36, the two sleeves keyed to the shafts by numerals 37 and 38, and the two flanges by numerals 39 and 40. Flange 39 is formed with jaws 41 between which fit jaws 42 carried by flange 40, and between the jaws are floating bearing members 42$^a$ corresponding to the floating bushings 15 of Figs. 1 and 2. Jaws 42 are formed of individual blocks through which pass bolts 43 which clamp jaws 42 between a flange 44 on a ring 45 and flange 40. Attached to flange 44 is a radial bearing ring 46 which is free to slide on sleeve 37 and between bearing ring 46 and sleeve 37 are oil overflow grooves 47. When axial movement occurs, sleeve 37 slides on bearing ring 46 as is obvious. Otherwise the parts and arrangement of Figs. 4 and 5 are the same as that of Figs. 1 and 2 and the same reference numerals are used thereon except that the exponent $a$ is added. The function and operation of the modification of Figs. 4 and 5 will be obvious from the description given in connection with Figs. 1 and 2 and further description is believed to be unnecessary.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In a coupling, adjacent flanges, members projecting from one of said flanges and having surfaces engaging surfaces of the other of said flanges, and floating bearing elements between said surfaces relatively to which said bearing surfaces are movable axially.

2. In a coupling, adjacent flanges, members projecting from one of said flanges and having surfaces engaging surfaces of the other flange, floating bearing elements between said surfaces, and means for lubricating said surfaces.

3. In a coupling, adjacent coupling elements, a ring surrounding one of said elements and engaging a side of the other, said ring having an inwardly projecting flange, projecting members carried between said other coupling element and the inwardly projecting flange and engaging surfaces on the one coupling element, and floating bearing means between the engaging surfaces relatively to which said bearing surfaces are movable axially.

4. In a coupling, adjacent coupling elements, a ring surrounding one of said coupling elements and engaging a side of the other, said ring having an inwardly projecting flange, projecting members carried between said other coupling element and the flange and engaging surfaces on the one coupling element, floating bearing means between the engaging surfaces, relatively to which said bearing surfaces are movable axially, and means for supplying lubricant between the coupling elements to lubricate the coupling.

5. In a coupling, adjacent coupling elements, a ring surrounding one of said coupling elements engaging a side of the other, said ring having an inwardly projecting flange, projecting members carried between said other coupling element and the flange and engaging surfaces on the one coupling element, floating bearing means between the engaging surfaces, means for supplying lubricant to the coupling, and means associated with the coupling for separating water from the lubricant.

6. In a coupling, adjacent flanges having a space between them, a ring surrounding said space, means for supplying lubricant to said space adjacent its center from where it is thrown out by centrifugal force, one of said flanges having a radially extending passage which at its outer end is in communication with the space between the flanges and at its inner end communicates with the space outside the coupling.

7. In a coupling, adjacent flanges, members projecting from one of said flanges and having surfaces engaging surfaces of the other of said flanges, and floating bearing elements between said surfaces, an end of each floating bearing element projecting beyond the confines of the engaging surfaces so it may be engaged by a tool to ascertain its working condition.

8. In a coupling, adjacent flanges, members projecting from one of said flanges, and having surfaces engaging surfaces of the other flange, and floating bearing elements between said surfaces, an end of a floating bearing element having notches adapted to be engaged by a tool to ascertain the working condition of the coupling.

9. The combination with adjacent shaft ends, of a coupling therefor comprising flanges carried by the shaft ends, pins carried by one flange and projecting through openings in the other, and floating bearing bushings surrounding the pins in said openings, said bushings being movable axially relatively to both said pins and openings.

10. The combination with adjacent shaft ends, of a coupling therefor comprising coupling elements carried by the shaft ends, a ring surrounding one of said coupling elements and engaging at one end the other coupling element, said ring having an inwardly projecting flange, pins carried at their two ends by said other coupling element and the flange, said pins projecting through openings in said one coupling element, and floating bearing bushings surrounding said pins, said bushings being movable axially relatively to both said pins and openings.

11. The combination with adjacent shaft ends, of a coupling therefor comprising coupling elements carried by the shaft ends, a ring surrounding one of said coupling elements and engaging at one end the other coupling element, said ring having an inwardly projecting flange, pins carried at their two ends by said other coupling element and the flange, said pins projecting through openings in said one coupling element, and floating bearing bushings surrounding said pins, said ring having openings through which a tool may be inserted to engage said bearing bushings to ascertain the operating condition of said pins.

12. The combination with adjacent shaft ends, of a coupling therefor comprising coupling elements carried by the shaft ends, a ring surrounding one of said coupling elements and engaging at one end the other coupling element, said ring having an inwardly projecting flange, pins carried at their two ends by said other coupling element and the flange, said pins projecting through openings in said one coupling element, and means for supplying lubricant to the space between said coupling elements adjacent their centers from where it is thrown out by centrifugal force, one of said coupling elements having a radially extending opening which communicates at its outer end with the periphery of the space between the coupling elements and at its inner end with the outside of the coupling.

13. The combination with adjacent shaft ends, of a coupling therefor comprising coupling elements carried by the shaft ends, a ring surrounding one of said coupling elements and engaging at one end the other coupling element said ring having an inwardly projecting flange, pins carried at their two ends by said other coupling element and the flange, said pins projecting through openings in said one coupling element, and means for supplying lubricant to the space between said coupling elements adjacent their centers from where it is thrown out by centrifugal force, there being oil grooves between said ring and the coupling element which it surrounds.

14. The combination with two adjacent flanges having a space between them, a ring surrounding such space, and interengaging members connecting the flanges so they rotate together, of means for supplying lubricant to said space, and means for separating water from such lubricant comprising conduit means which extends first radially outward from the periphery of said space and then radially inward toward the center thereof whereby two parallel columns are established.

15. The combination with two adjacent flanges having a space between them, and means enclosing said space at the periphery, of walls forming a passage which extends from the periphery of said space radially outward, one of said flanges having a radially extending hole therein which connects the radially outer portion of said passage to the space outside the coupling.

16. The combination with two adjacent flanges having a space between them, and means enclosing said space at the periphery, of walls forming a passage which extends from the periphery of said space radially outward, one of said flanges having a radially extending hole therein which extends from the outer portion of said passage radially inward toward the center of the flange where it is connected to the area outside the coupling.

17. In combination, two adjacent shaft ends, coupling flanges thereon, one of which has spaced openings, projecting members carried by the other of said flanges and having sliding engagement with the openings in said one flange, and a ring carried by one of said flanges and surrounding the other flange, said last named flange having a sliding fit with the ring whereby the ring serves to guide it and hold the coupling in alignment.

18. The combination with a shaft end having an adjacent bearing and a second shaft end which does not have an adjacent bearing, of a coupling therefor comprising flanges on said shaft ends, the flange on the first named shaft end being provided with spaced openings, projecting members carried by the flange on the second named shaft end and having sliding engagement with the said spaced openings, and a ring carried by one of said flanges and surrounding the other flange, said last named flange having a sliding fit with the ring whereby the ring serves to guide it and hold the coupling in alignment.

19. The combination with a shaft end having an adjacent bearing and a second shaft end which does not have an adjacent bearing, of a coupling therefor comprising flanges on said shaft ends, the flange on the first named shaft end being provided with spaced openings, pins carried by the flange on the second named shaft ends and having sliding engagement with said spaced openings, and a ring carried by the flange on the second named shaft end, said ring surrounding and bearing on the periphery of the flange on the first named shaft end and having a sliding fit therewith whereby the ring serves to guide it and hold the coupling in alignment, the center of the mass of said ring being in line with the centers of said pins.

In witness whereof, I have hereunto set my hand this 25th day of March, 1919.

JAMES WILKINSON.